United States Patent [19]

Greene, III

[11] Patent Number: 4,970,853
[45] Date of Patent: Nov. 20, 1990

[54] PUSH RAKE FOR LEAVES AND THE LIKE

[76] Inventor: Jesse M. Greene, III, 1307 Walnut St., No. 25, Cary, N.C. 27511

[21] Appl. No.: 502,408

[22] Filed: Mar. 30, 1990

[51] Int. Cl.$^5$ .......................... A01D 7/00; A01D 7/06
[52] U.S. Cl. .................. 56/400.01; 56/400.21
[58] Field of Search ........... 56/400.11, 400.13, 400.14, 56/400.15, 400.16, 400.17, 400.01, 400.09, 400.21

[56] References Cited

U.S. PATENT DOCUMENTS

| | | | |
|---|---|---|---|
| 162,457 | 4/1875 | Bishop et al. | 56/400.11 |
| 323,252 | 7/1885 | Alexander | 56/400.13 |
| 914,087 | 3/1909 | Sutphen | 56/400.13 |
| 951,024 | 3/1910 | Parker | 56/400.11 |
| 979,346 | 12/1910 | Skjeldrup | 56/400.13 |
| 1,070,868 | 8/1913 | Worthington | 56/400.11 |
| 1,763,473 | 6/1930 | Mehl | 56/400.13 |
| 1,763,757 | 6/1930 | Charles | 56/400.13 |
| 1,866,754 | 7/1932 | Crane | 56/400.13 |
| 2,504,715 | 4/1950 | Meyers | 56/400.11 |
| 2,638,730 | 5/1953 | Davidson | 56/400.14 |
| 4,644,740 | 2/1987 | Lee | 56/400.04 |

Primary Examiner—Stephen J. Novosad
Attorney, Agent, or Firm—Richard E. Jenkins

[57] ABSTRACT

A push rake having a handle member with a transverse frame secured to one end thereof for carrying a plurality of tines. The tines define an arcuate forwardly extending lowermost portion which carries a fixed cylindrical bearing member. The fixed bearing member serves to provide rigidity to the tines as well as a fixed bearing surface to accommodate movement of the raking device across a ground surface.

15 Claims, 2 Drawing Sheets

PUSH RAKE FOR LEAVES AND THE LIKE

Technical Field

The present invention relates to lawn rakes, and more particularly relates to an improved push rake for quickly and easily removing large volumes of leaves and similar debris from a lawn.

BACKGROUND ART

The lawn raking implement art is replete with efforts by inventors to devise a new and improved device for easily removing a large volume of leaves and debris from a yard. For example, U.S. Pat. No. 4,644,740 to Lee discloses a reversible rake which is adapted to be pushed across the ground or, in the alternative, turned over and pulled toward the user in a traditional raking action. The patent discloses a reversible rake comprising a handle which is connected at its lower end to a U-shaped steel element to which the raking tines are secured, and which serves as a bearing surface when the rake is pushed forwardly to collect leaves. When the rake of the invention is inverted in order to be used as a pull rake, the U-shaped surface is also inverted and does not then function as a bearing surface.

Also of interest, U.S. Pat. No. 979,346 to Skjeldrup discloses a push rake having a plurality of tines extending generally forwardly of the rake and which are secured to a cross-beam in the rear of the rake. A plurality of runners are secured beneath the rear portion of the tines in order to facilitate movement of the push rake along a ground surface. U.S. Pat. No. 323,252 to Alexander et al. discloses a lawn rake having a handle and a plurality of tines which extend through a support head carried by freely rotatable wheels at each end thereof. Also, U.S. Pat. No. 914,087 to Sutphen teaches a push rake comprising a handle secured to a cross-head element which carries a plurality of parallel, forwardly extending tines. The rake is provided with a freely rotatable roller which extends substantially across the width of the rake and is positioned behind the rake head to facilitate forward movement of the push rake.

DISCLOSURE OF THE INVENTION

In accordance wit the present invention, applicant provides an improved push rake for leaves and the like comprising an elongated handle member having a first and second end. A transverse support frame is affixed adjacent to the first end of the handle member, and a plurality of raking tines are carried by the support frame and extend outwardly beyond the first end of the handle member and the support frame with the outwardly extending portion of the raking tines terminating in an arcuate end which defines an angle of between about 30°–60° with the longitudinal axis of the raking tines. A transverse cylindrical bearing member defining a plurality of apertures therethrough is spaced-apart from the support frame and adapted to be slidably received by the outwardly extending portion of the plurality of tines to provide rigidity thereto and to further serve as a fixed bearing surface to facilitate movement of the raking device across a ground surface. Finally, the raking device includes means to secure the transverse bearing member at a predetermined position along the arcuate end portion of the outwardly extending portion of the tines.

It is therefore the object of the present invention to provide a push rake which may be easily pushed forwardly to accumulate and move a large volume of leaves from a ground surface area.

A further object of the present invention is to provide a push rake which is lightweight and easy to use in moving leaves and other yard debris from a large yard area without the necessity for using complex motorized equipment.

Still a further object of the present invention is to provide a push rake which is lightweight and simple in construction and yet able to effectively remove large volumes of leaves from a yard area without the labor requirements of a conventional rake or the expense and noise associated with recently developed motorized leaf blowers.

Some of the objects of the invention having been stated, other objects will become evident as the description proceeds, when taken in connection with the accompanying drawings.

BEST MODE FOR CARRYING OUT THE INVENTION

Figure 1:
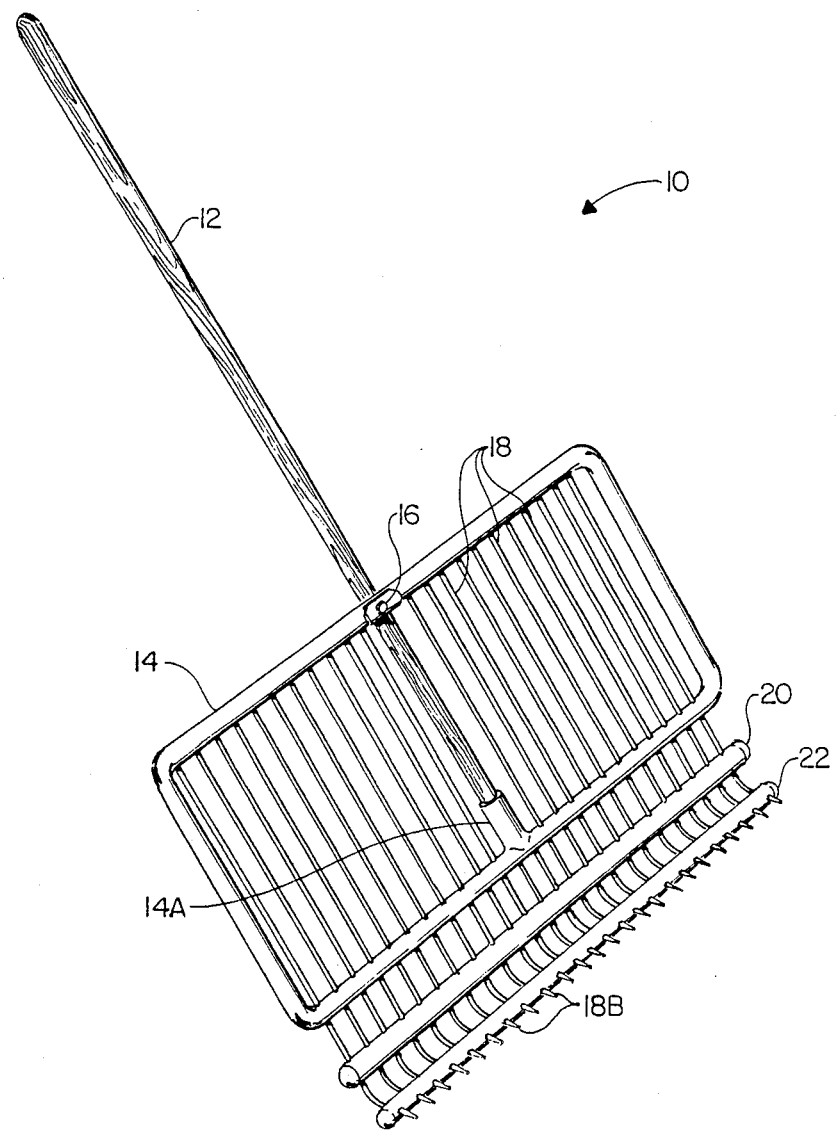
FIG. 1 is a perspective view of a push rake in accordance with the present invention.
Figure 2:
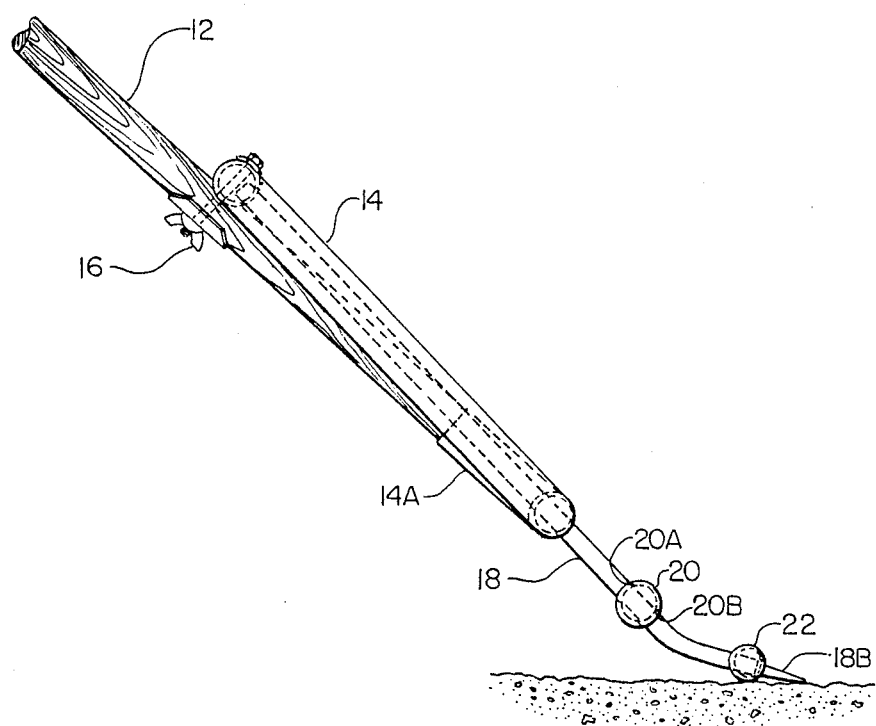
FIG. 2 is a side elevation view of the push rake according to the present invention being pushed across a ground surface.
Figure 3:
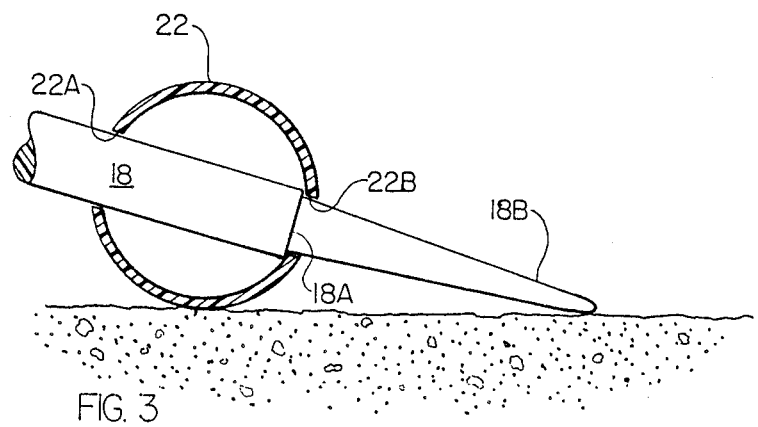
FIG. 3 is a fragmentary vertical cross-sectional view showing the positioning of a tine within the cylindrical bearing member of the push rake of the present invention.

Referring now to FIGS. 1–3 of the drawings depicting a preferred embodiment of the invention, the push rake is generally designated 10. Push rake 10 comprises an elongated handle 12 which is most suitably a wooden handle. Handle 12 is connected at one end to transverse frame 14 by suitable means. In the embodiment depicted in the drawings, handle 12 is affixed to transverse frame 14 by first inserting handle 12 into collar 14A and then securing handle 12 to frame 14 with suitable screw and wing nut assembly 16.

A plurality of spaced-apart tines 18 are carried by opposing sides of frame 14, and the tines extend through and beyond the lower side of frame 14 and terminate in an arcuate end portion with the pointed ends thereof generally directed forwardly of push rake 10 in a direction substantially parallel to the ground when the push rake is pushed at an angle of about 45° by the user. Most suitably, the terminal arcuate portion of tines 18 defines an angle of between about 30–60°, preferably about 45°, with the longitudinal axis of tines 18 (see FIG. 2).

Preferably, tines 18 extending beyond transverse frame 14 extend first through corresponding apertures in a transverse support rod 20 which provides increased rigidity to tines 18. Next, tines 18 extend through corresponding apertures in transverse cylindrical bearing member 22 which serves to provide additional rigidity to tines 18 as well as the very important function of providing a fixed bearing surface upon which push rake 10 easily slides during forward movement thereof. Although a matter of design choice, most suitably transverse frame 14, transverse support rod 20, and transverse cylindrical bearing member 22 are formed from polyvinylchloride (PVC) tubing, and tines 18 are formed from rods of PVC. Also, although other means of securement may be utilized, it is presently contemplated that tines 18 will be adhesively secured to transverse frame 14 as well as transverse support rod 20 and transverse cylindrical bearing member 22.

With particular reference to FIG. 3, the means by which push rake 10 prevents the movement of transverse cylindrical bearing member 22 back and upwardly upon tines 18 as the rake is used can be better appreciated. In addition to glue adhesion of bearing member 22 to tines 18, it can be seen that tines 18 define a shoulder 18A and a reduced diameter conical point 18B at the end thereof. The dimensions of shoulder 18A and conical point 18B of tines 18 is such that tines 18 may be slidably received within corresponding apertures 22A of cylindrical bearing member 22 which are substantially of the same size as the diameter of tine 18. However, opposing apertures 22B of cylindrical bearing member 22 are of a relatively smaller diameter so as to allow only conical points 18B of tines 18 therethrough so that shoulders 18A of tines 18 abut apertures 22B. In this fashion, each of shoulders 18A of the plurality of tines 18 serves to form a stop and to thereby prevent transverse cylindrical bearing member 22 from moving rearwardly on tines 18 as push rake 10 is pushed forwardly across a yard surface. Without the benefit of this construction feature, it is possible that the forces impacting transverse cylindrical bearing member 22 during use would be such as to break the adhesive securing bearing member 22 to tines 18 and result in the undesirable repositioning thereof rearwardly of the predetermined desired position best seen in FIGS. 2 and 3.

A representative size for push rake 10 is set forth below in Example 1:

EXAMPLE 1

Example 1

| | |
|---|---|
| Length of Wooden Handle 12 | 51 inches (1⅛ inch diameter) |
| Diameter of PVC Tubing for Transverse Frame and Transverse Support Rod | ¾ inch |
| Diameter of PVC Tubing for Transverse Bearing Member | ½ inch |
| Diameter of Plastic Rods Forming Tines | 5/16 inch |
| Width of Transverse Frame | 30 inches |

It will thus be seen that there has been described above an improved push rake for use in easily moving large volumes of leaves and other yard debris with significantly less effort than a conventional pull-type rake and without the expense and noise of motorized portable leaf blowers well known to those familiar with yard care implements.

It will be understood that various details of the invention may be changed without departing from the scope of the invention. Furthermore, the foregoing description is for the purpose of illustration only, and not for the purpose of limitation—the invention being defined by the claims.

What is claimed is

1. A raking device comprising:
   an elongated handle member having a first and a second end;
   a transverse support frame affixed adjacent to said first end of said handle member;
   a plurality of raking tines carried by said support frame and having a portion of the length thereof extending outwardly beyond said first end of said handle member and said support frame, said outwardly extending portion of said raking tines terminating in an arcuate end which defines an angle of between about 30°–60° with the longitudinal axis of said raking tines;
   a transverse cylindrical bearing member spaced-apart from said support frame and defining a plurality of apertures therethrough, said bearing member being adapted to be slidably received by the outwardly extending portion of said plurality of tines to provide rigidity to said tines and to serve as a fixed bearing surface to accommodate movement of said raking device across a ground surface; and
   means to secure said transverse bearing member at a predetermined position along the arcuate end portion of the outwardly extending portion of said tines.

2. A raking device according to claim 1 wherein said transverse support frame comprises an open, four-sided sided frame with said plurality of tines extending between two opposing sides thereof.

3. A raking device according to claim 2 wherein said support frame comprises plastic tubing.

4. A raking device according to claim 1 wherein said plurality of raking tines each comprise a substantially rigid tine defining a shoulder and adjacent reduced diameter conical point on the arcuate end thereof.

5. A raking device according to claim 4 wherein said transverse bearing member defines two apertures therein for receiving each of said tines, the first of said apertures being sized to slidably receive said tine and the second of said apertures being of a relatively smaller diameter so as to snubbingly engage the shoulder of said tine to prevent said bearing member from being forced further along said tine toward said support frame as said raking device is pushed across a ground surface.

6. A raking device according to claim 5 wherein said tines are plastic.

7. A raking device according to claim 1 wherein said transverse bearing member is a plastic tube and adhesively secured in position on said tines.

8. A raking device according to claim 1 further including a plastic transverse support rod positioned between said support frame and said transverse bearing member with said tines extending therethrough, said transverse support rod serving to provide greater rigidity to said tines.

9. A raking device comprising:
   an elongated handle member having a first and a second end;
   a transverse support frame affixed adjacent to said first end of said handle member, said support frame comprising an open, four-sided frame;
   a plurality of raking tines carried by said support frame and extending between two opposing sides thereof, said tines having a portion of the length thereof extending outwardly beyond said first end of said handle member and said support frame, and terminating in an arcuate end which defines an angle of between about 30°–60° with the longitudinal axis of said raking tines;
   a transverse cylindrical bearing member spaced-apart from said support frame and defining a plurality of apertures therethrough, said bearing member being adapted to be slidably received by the outwardly extending portion of said plurality of tines to provide rigidity to said tines and to serve as a fixed bearing surface to accommodate movement of said raking device across a ground surface;

means to secure said transverse bearing member at a predetermined position along the arcuate end portion of the outwardly extending portion of said tines; and a transverse support rod positioned between said support frame and said transverse bearing member with said tines extending therethrough, said transverse support rod serving to provide greater rigidity to said tines.

10. A raking device according to claim 9 wherein said support frame comprises plastic tubing.

11. A raking device according to claim 9 wherein said plurality of raking tines each comprise a substantially rigid tine defining a shoulder and adjacent reduced diameter conical point on the arcuate end 12. A raking device according to claim 11 wherein said transverse bearing member defines two apertures therein for receiving each of said tines, the first of said apertures being sized to slidably receive said tine and the second of said apertures being of a relatively smaller diameter so as to snubbingly engage the shoulder of said tine to prevent said bearing member from being forced further along said tine toward said support frame as said raking device is pushed across a ground surface.

13. A raking device according to claim 12 wherein said tines are plastic.

14. A raking device according to claim 9 wherein said transverse bearing member is a plastic tube and adhesively secured in position on said tines.

15. A raking device according to claim 9 wherein said transverse support rod is plastic.

* * * * *